(12) United States Patent
Li

(10) Patent No.: US 9,270,129 B2
(45) Date of Patent: Feb. 23, 2016

(54) INTELLIGENT PULSE TEMPERATURE CONTROL CHARGER

(75) Inventor: Mengquan Li, Hangzhou (CN)

(73) Assignee: HANGZHOU CHUANGMEI INDUSTRY CO., LTD., Hangzhou (CN)

( * ) Notice: Subject to any disclaimer, the term of this patent is extended or adjusted under 35 U.S.C. 154(b) by 191 days.

(21) Appl. No.: 13/985,573

(22) PCT Filed: Sep. 12, 2012

(86) PCT No.: PCT/CN2012/081273
§ 371 (c)(1),
(2), (4) Date: Aug. 15, 2013

(87) PCT Pub. No.: WO2013/152571
PCT Pub. Date: Oct. 17, 2013

(65) Prior Publication Data
US 2014/0139177 A1    May 22, 2014

(30) Foreign Application Priority Data

Apr. 12, 2012    (CN) .......................... 2012 1 0107666

(51) Int. Cl.
```
H02J 7/00      (2006.01)
H02J 7/14      (2006.01)
H02G 11/02     (2006.01)
B65H 75/44     (2006.01)
H04M 1/15      (2006.01)
B60K 1/00      (2006.01)
B62D 49/06     (2006.01)
H02J 7/04      (2006.01)
H02J 7/10      (2006.01)
```
(52) U.S. Cl.
CPC .............. *H02J 7/0042* (2013.01); *H02J 7/047* (2013.01); *B60K 1/00* (2013.01); *B62D 49/06* (2013.01); *B65H 75/44* (2013.01); *H02G 11/02* (2013.01); *H02J 7/14* (2013.01); *H02J 2007/105* (2013.01); *Y02T 10/70* (2013.01)

(58) Field of Classification Search
CPC ............... H02J 7/00; H02J 7/14; H02J 7/042; H02J 7/047; H02J 7/105; H02G 11/02; B65H 75/44; H04M 1/15; B60K 1/00; B62D 49/06; Y02T 10/70
USPC ................. 320/109, 104, 105; 180/313, 65.1; 191/12.2 R, 12.4, 12.2 A
See application file for complete search history.

(56) References Cited

U.S. PATENT DOCUMENTS 9,112,248 B2 *  8/2015  Johnson .................... B25F 5/00
2006/0091858 A1 *  5/2006  Johnson et al. ............... 320/128

(Continued)

*Primary Examiner* — Phallaka Kik
(74) *Attorney, Agent, or Firm* — Symbus Law Group, LLC; Clifford D. Hyra

(57) ABSTRACT

A battery charger employs a temperature sensor and single chip microcomputer (SCM) programs for controlling and performs charging with a pulse current. The polarization occurred during battery charging can be eliminated and the charging voltage and current can be automatically regulated based on ambient temperature. An intelligent pulse temperature control charger has a casing and a charging circuit having a high voltage switch power supply circuit and a low voltage control circuit. In the low voltage control circuit, a SCM is employed for controlling, the SCM has three pins as input terminals connected to a temperature sampling circuit, charging voltage sampling circuit and charging current sampling circuit of the battery, respectively, and the SCM has two pins as output terminals, one connected via a photoelectric coupler with the high voltage switch power supply and the other connected with a dichromatic light emitting tube and a heat dissipation fan.

4 Claims, 2 Drawing Sheets

(56) References Cited

U.S. PATENT DOCUMENTS

2010/0268493 A1* 10/2010 Tae ................................ 702/63
2011/0101910 A1* 5/2011 Li et al. ......................... 320/106
2011/0133655 A1* 6/2011 Recker et al. ................. 315/159
2011/0291608 A1* 12/2011 Shimura et al. ............... 320/101
2015/0282261 A1* 10/2015 Recker ...................... H02J 9/02
315/121

* cited by examiner

INTELLIGENT PULSE TEMPERATURE CONTROL CHARGER

This application claims the benefit of Chinese patent application No. 201210107666.8, filed Apr. 12, 2012, which is hereby incorporated by reference in its entirety.

TECHNICAL FIELD

The present invention relates to a battery charger, and specifically to a complementary charger for a lead-acid battery of an electric bike after use.

BACKGROUND OF THE INVENTION

The prior lead-acid battery charger of the electric bike generally has a three-stage charging mode, i.e. constant current charging, constant voltage charging, and constant voltage trickle charging. Always a direct current is output and the battery will be polarized during charging. Moreover, the voltage value and the current value during charging are given under a temperature condition of 25° C. As the charging for the lead-acid battery is remarkably affected by the air temperature, the battery would be over-charged in summer and would be under-charged in winter. Both the over-charging and under-charging would cause water loss and sulfation of the lead-acid battery.

SUMMARY OF THE INVENTION

The object of the present invention is to overcome the above-mentioned defects in the prior art. A temperature sensor is employed and single chip microcomputer (SCM) programs are employed for controlling. The battery is charged with a pulse current such that the polarization occurred during its charging can be eliminated. The charging voltage and current can be automatically regulated based on the ambient temperature.

The present invention proposes the following technical solutions:

An intelligent pulse temperature control charger, comprising a casing and a charging circuit which comprises a high voltage switch power supply circuit and a low voltage control circuit, characterized in that in the low voltage control circuit, a single chip microcomputer (SCM) is employed for controlling, the SCM has three pins as input terminals which are connected to a temperature sampling circuit, a charging voltage sampling circuit and a charging current sampling circuit of the battery DC, respectively; the SCM has two pins as output terminals, one of which is connected via a photoelectric coupler with a high voltage switch power supply and the other of which is connected in turn with a dichromatic light emitting tube and a heat dissipation fan.

The SCM in the low voltage control circuit has three pins as input terminals;

a stabilized voltage integration block is connected via a resistor (R19) to a temperature sensitive diode (D10) and diodes (D11, D12) which are connected in series with one another, and is grounded via a negative electrode of the diode (D12), a node of the resistor (R19) and the temperature sensitive diode (D10) is connected to the fifth pin of the SCM, thus functioning as the temperature sampling circuit;

a negative electrode of the battery (DC) is connected via an insert connector (SK) to an end of resistors (R15, R16), the other end of the resistor (R15) is grounded, and the other end of the resistor (R16) is connected to a capacitor (C14) and the sixth pin of the SCM, thus functioning as the charging current sampling circuit;

a positive electrode of the battery (DC) is connected via an insert connector (SK) to a positive electrode of a diode (D9) and an end of a contact of a relay (K), a negative electrode of the diode (D9) is connected to a coil of the relay (K) and an end of a resistor (R17), the other end of the resistor (R17) is grounded via a resistor (R18) which is connected in parallel with a capacitor (C12), functioning as a voltage division filtering circuit, and a voltage division point of the resistors (R18, R17) is connected to the seventh pin of the SCM, thus functioning as the charging voltage sampling circuit;

the other end of the contact of a relay (K) is connected to a negative electrode of a diode (D7), a positive electrode of the diode (D7) is connected to the fifth connecting terminal of a secondary coil of a high frequency transformer (T), and the sixth connecting terminal of the secondary coil is grounded.

The SCM in the low voltage control circuit has two pins as output terminals;

the second pin of the SCM is grounded via a resistor (R13), a light emitting tube of the photoelectric coupler (PC), and an indication light emitting tube (VL1), to control the high voltage switch power supply circuit;

the third pin of the SCM is connected via a resistor (R25) to a base of a triode (VT2) having a collector connected to a connection point of resistors (R23, R26, R27), the other end of the resistor (R26) is connected to a red light of the dichromatic light emitting tube (VL2), the other end of the resistor (R27) is connected to a base of a triode (VT3) having an emitter connected to a base of a triode (VT4) and having a collector connected to a green light of the dichromatic light emitting tube (VL2) and an end of a resistor (R24), the triode (VT4) has an emitter grounded and has a collector connected to a negative end of the heat dissipation fan (FS) having a positive end connected via a resistor (R14) to a positive end of a capacitor (C13) and a negative electrode of a diode (D8), a positive electrode of the diode (D8) is connected to the seventh connecting terminal of a secondary coil of the high frequency transformer, and the eighth connecting terminal of the secondary coil is grounded.

In the low voltage control circuit, the battery (DC) is connected with the insert connector, the positive electrode of the battery (DC) is connected via the diode (D9), the coil of the relay (K), resistors (R20, R21) for voltage division, capacitors (C15, C16) for filtering, the voltage stable integration chip for voltage stabilization, a resistor (R22) for micro-regulation to output a voltage of 5.12V, and via capacitors (C17, C18) for filtering, to supply the SCM with operation power.

In the high voltage switch power supply circuit, a collector of a photoelectric triode of the photoelectric coupler (PC) is connected to a node of resistors (R5, R6), the other end of the resistor (R5) is extended into two branches, one of which is connected via a resistor (R1) to the first connecting terminal of a primary coil of the high frequency transformer and the other of which is connected via a resistor (R11) and a diode (D6) to the third connecting terminal of the primary coil of the high frequency transformer, and the other end of the resistor (R6) is connected to the second pin of the integrate circuit.

The operation principle of the present invention is as follows: the SCM detects the ambient temperature by temperature sensor 2 (which employs temperature sensitive diode D10), automatically calculates the voltage and current to be charged currently, and controls, by the photoelectric coupler, the switch power supply to output a number of pulses per second with a duty ratio, thus controlling the voltage and current for charging.

The beneficial effects of the present invention lie in that compared with the prior lead-acid battery charger, the present invention has five features as follows:

1. pulse charging to facilitate eliminating polarization occurred during charging;
2. automatically regulating the charging voltage and current based on the ambient temperature such that the lead-acid battery will not be over-charged in hot days and not be under-charged in cold days;
3. having a function of time alarming for trickle charging wherein it needs to be charged for further 2-3 hours after a green light is turned on, indicating the lead-acid battery enters the trickle charging stage (while the prior charger does not have the function of time alarming);
4. having a five-stage charging mode;
5. having a protection function against wrong connection of battery electrodes.

DESCRIPTION OF EXEMPLARY EMBODIMENTS

Hereinafter, the present invention will be further described in combination with the accompanying figures of the description.

Figure 1:
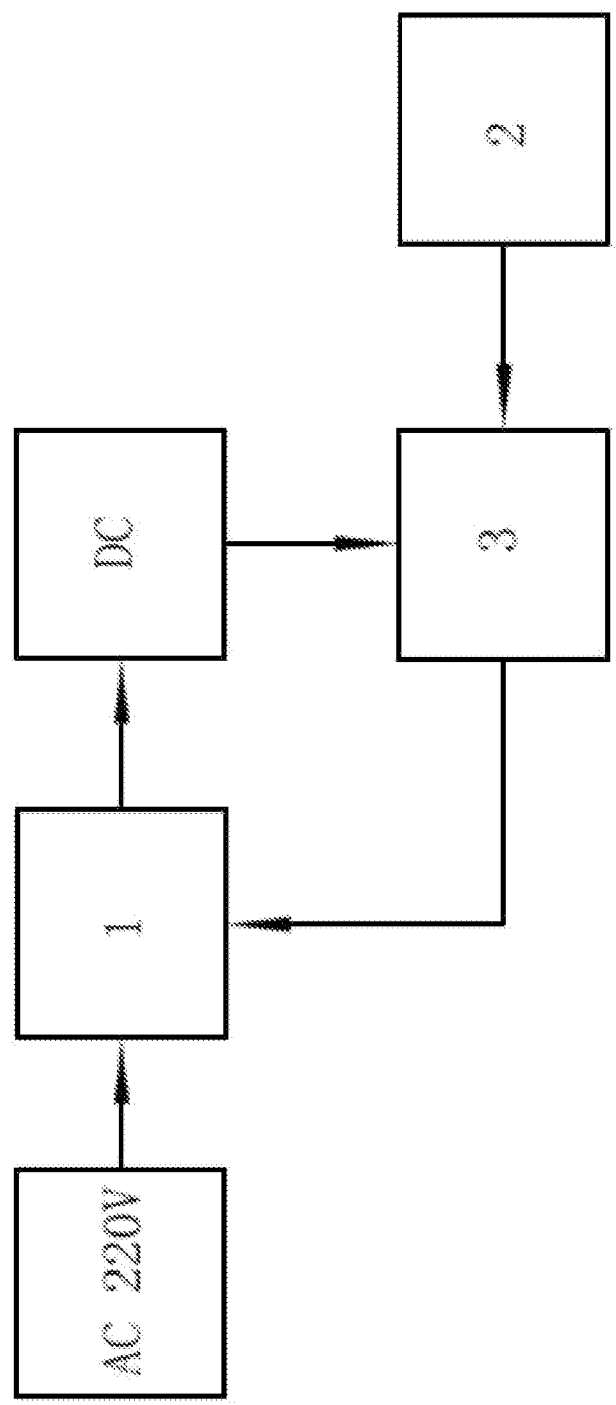
FIG. 1 is a block diagram of the principle of the present invention.
Figure 2:
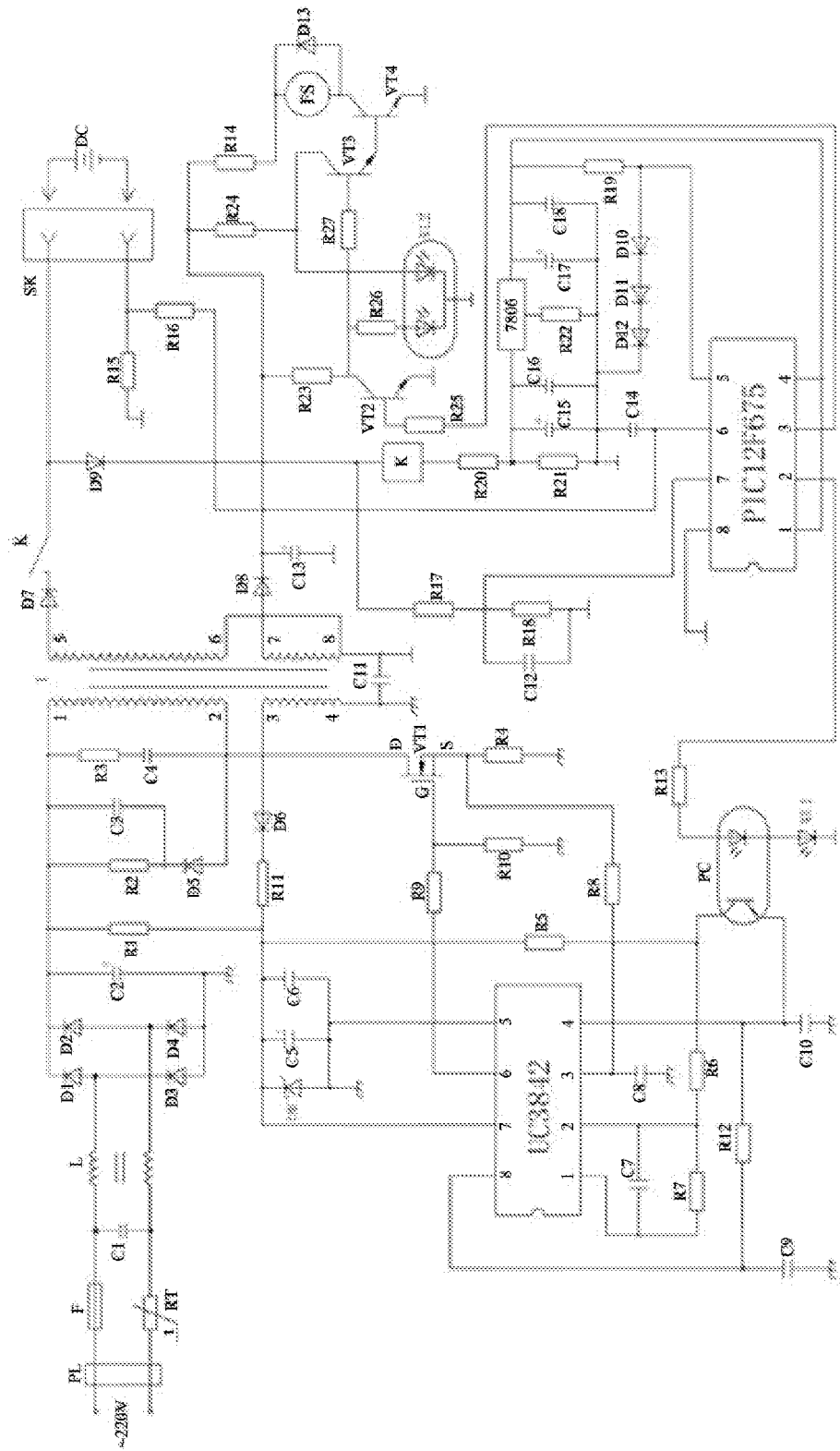
FIG. 2 is a circuit diagram of the principle of the present invention.

As shown in FIGS. 1 and 2, the intelligent pulse temperature control charger of the present invention comprises a casing and a charging circuit. In order to make the figures clean, the casing is omitted in the figures.

The charging circuit comprises a high voltage switch power supply circuit 1 and a low voltage control circuit 3.

In the high voltage switch power supply circuit, the plug PL is connected to a 220V AC power supply. Two power supply lines of the plug are connected through the fuse F and the thermal resistor RT having a negative temperature coefficient, respectively. A capacitor C1 is connected between the two power supply lines. The two power supply lines are connected, via choke coils L, respectively, to input terminals of a bridge rectifier circuit (comprising diodes D1, D2, D3, D4). The bridge rectifier circuit has positive and negative output terminals connected to a filtering capacitor C2. The positive end of the filtering capacitor C2 is connected to one end of each of resistors R1, R2, R3 and a capacitor C3 as well as the first connecting terminal of a primary coil (on the high voltage side) of the high frequency transformer T. The resistor R2 and the capacitor C3 are connected in parallel with each other and then are connected to a negative electrode of a diode D5. The resistor R3 is connected in series with a capacitor C4. A positive electrode of the diode D5 and the other end of the capacitor C4 are connected to the second connecting terminal of the primary coil of the high frequency transformer and a drain (i.e. the D electrode in FIG. 2) of a field effect transistor (FET) VT1. A source (the S electrode in the figure) of the FET is connected one end of each of resistors R4, R8. The other end of the resistor R4 is connected to a common end on the high voltage side. The other end of the resistor R8 is connected to a capacitor C8 and the third pin of an integrate circuit (IC) (being a pulse width modulation IC, preferably the UC3842). A resistor R7 and a capacitor C7 are connected in parallel between the first and second pins of the IC. The second pin is also connected to a resistor R6. The other end of the resistor R6 is connected to a collector of a photoelectric triode of the photoelectric coupler PC and a resistor R5. The other end of the resistor R5 is connected to the power supply on the high voltage side (wherein the resistor R5 is connected with the resistor R1). An emitter of the photoelectric triode is connected to the common end on the high voltage side. The eighth pin of the IC outputs a stabilized voltage power supply of 5V. The eighth pin is connected to a filtering capacitor C9 and a resistor R12. The other end of the resistor R12 is connected to the fourth pin of the IC and a capacitor C10. The fifth pin of the IC is connected to the common end on the high voltage side. The seventh pin of the IC is connected to an operation power supply on the high voltage side. The sixth pin of the IC is connected via a resistor R9 to a gate (the G electrode in FIG. 2) of the FET and a resistor R10. The other end of the resistor R10 is connected to the common end on the high voltage side. The third connecting terminal of the high frequency transformer is connected, via a diode D6 and a resistor R11, to a positive end of a capacitor C5. The capacitor C5 is connected in parallel with a capacitor C6 and a voltage regulator tube DW. The positive end of the capacitor C5 is connected, via a resistor R1, to a 300V high voltage rectifier power supply (wherein the above-described bridge rectifier circuit comprises the diodes D1, D2, D3, D4 outputs a 300V voltage).

Explanation: the above-described high frequency transformer is provided with four groups of windings independent with one another (having a common Fe core). The winding terminals of the first winding are the first and second connecting terminals (on the high voltage side of the circuit). The winding terminals of the third winding are the fifth and sixth connecting terminals (on the low voltage side of the circuit). The winding terminals of the second winding are the third and fourth connecting terminals (wherein the fourth connecting terminal is connected to the common end). The winding terminals of the fourth winding are the seventh and eighth connecting terminals. A capacitor C11 is connected between the fourth connecting terminal and the eighth connecting terminal The above structure is similar to that of the traditional charger.

In the low voltage control circuit, the SCM is employed as a main control chip (which preferably is the PIC12F675) and has three pins as input terminals.

In the SCM, a stabilized voltage integration block (i.e. a three ends stable IC, preferably the 7805) is connected via a resistor R19 to a temperature sensitive diode D10 and diodes D11, D12 which are connected in series with one another, and the diode D12 is grounded by its negative electrode, a node of the resistor R19 and the temperature sensitive diode D10 is connected to the fifth pin of the SCM, thus functioning as the temperature sampling circuit.

A negative electrode of the battery DC is connected via an insert connector SK to resistors R15, R16, the other end of the resistor R15 is grounded, and the other end of the resistor R16 is connected to a capacitor C14 and the sixth pin of the SCM (wherein the other end of the capacitor C14 is grounded), thus functioning as the charging current sampling circuit.

A positive electrode of the battery DC is connected via an insert connector SK to a positive electrode of a diode D9 and an end of a contact of a relay K, a negative electrode of the diode D9 is connected to a coil of the relay K and a resistor R17, the other end of the resistor R17 is grounded via a resistor R18 which is connected in parallel with a capacitor C12, functioning as a voltage division filtering circuit, and a voltage division point of the resistors R18, R17 is connected to the seventh pin of the SCM, thus functioning as the charging voltage sampling circuit.

The other end of the contact of a relay K is connected to a negative electrode of a diode D7, a positive electrode of the diode D7 is connected to the fifth connecting terminal of a high frequency transformer, and the sixth connecting terminal of the high frequency transformer is grounded.

In the low voltage control circuit, the SCM has two pins as output terminals.

The second pin of the SCM is connected via a resistor R13 with a light emitting tube of the photoelectric coupler PC, and the light emitting tube of the photoelectric coupler PC is grounded via an instructing light emitting tube VL1, to control the high voltage switch power supply.

The third pin of the SCM is connected via a resistor R25 to a base of a triode VT2 having a collector connected to a connection point of resistors R23, R26, R27, the other end of the resistor R26 is connected to a red light of the dichromatic light emitting tube VL2, the other end of the resistor R27 is connected to a base of a triode VT3 having an emitter connected to a base of a triode (VT4) and having a collector connected to a green light of the dichromatic light emitting tube VL2 and an end of a resistor R24, the triode VT4 has an emitter grounded and has a collector connected to a negative end of the heat dissipation fan FS having a positive end connected via a resistor R14 to a positive end of a capacitor C13 and a negative electrode of a diode D8, a positive electrode of the diode D8 is connected to the seventh connecting terminal of the high frequency transformer, and the eighth connecting terminal is grounded. The other end of the resistor R24 is connected with a positive end of the capacitor C13. The heat dissipation fan FS is connected in parallel with the diode D13.

In the low voltage control circuit, the operation power supply of the SCM comes from the battery DC (which has a certain amount of electricity left even after use and waiting for supplement charging). The battery DC is connected, via the insert connector, and by its positive electrode, via the diode D9, the coil of the relay K, resistors R20, R21 for voltage division, capacitors C15, C16 for filtering, the voltage stabilization integration block for voltage stabilization, a resistor R22 for fine-tuning to output a voltage of 5.12V, and via capacitors C17, C18 for filtering, to supply the SCM with operation power.

The 220V AC power supply is rectified and filtered to obtain a DC voltage of about 300V. In one branch, it is input from the first connecting terminal of the high frequency transformer, via the first and second connecting terminals of the high frequency transformer, to a drain of a power field effect tube. In the other branch, it is connected via an initiating resistor R1 to the positive end of the capacitor C5. When the light emitting tube in the photoelectric coupler PC is controlled to turn on, the photoelectric triode will then turn on to make the IC operate. The sixth pin of the IC outputs a switch pulse of about 54 KHZ to turn on or off the FET VT1, and by mutual induction of the high frequency transformer, a voltage required for normal operation is obtained: the fifth and sixth connecting terminals are used to output the charging voltage, the third and fourth connecting terminals are used to output the operation power supply on the high voltage side, the seventh and eighth connecting terminals are used to output the voltages required for the heat dissipation fan FS and the indication light (i.e. the dichromatic light emitting tube VL2); when the light emitting tube in the photoelectric coupler PC is controlled to turn off, the IC makes the FET VT1 to turn off.

The invention claimed is:

1. An intelligent pulse temperature control charger, comprising a casing and a charging circuit having a high voltage switch power supply circuit and a low voltage control circuit, wherein in the low voltage control circuit, a single chip microcomputer (SCM) is employed for controlling the low voltage control circuit, the SCM has three pins as input terminals which are connected to a temperature sampling circuit of a battery, a charging voltage sampling circuit of the battery and a charging current sampling circuit of the battery, respectively; the SCM has two pins as output terminals, one of which is connected via a photoelectric coupler with a high voltage switch power supply and the other of which is connected in turn with a dichromatic light emitting tube and a heat dissipation fan, the SCM in the low voltage control circuit has two pins as output terminals;

a second pin of the SCM is grounded via a resistor, the light emitting tube of the photoelectric coupler, and an indication light emitting tube, to control the high voltage switch power supply;

a third pin of the SCM is connected via a resistor to a base of a first triode, and a collector of the first triode is connected to a connection point of sixth, seventh and eighth resistors, the other end of the seventh resistor is connected to a red light of the dichromatic light emitting tube, the other end of the eighth resistor is connected to the base of a second triode, and an emitter of the second triode is connected to a base of a third triode, a collector of the second triode is connected to a green light of the dichromatic light emitting tube and one end of a ninth resistor, an emitter of the third triode is grounded, and the collector of the third triode is connected to a negative terminal of the heat dissipation fan, and a positive terminal of the heat dissipation fan is connected via a resistor to the positive terminal of a capacitor and a negative electrode of a fifth diode, a positive electrode of the fifth diode is connected to a seventh connecting terminal of a secondary coil of a high frequency transformer, and an eighth connecting terminal of the secondary coil is grounded.

2. The intelligent pulse temperature control charger according to claim 1, characterized in that the SCM in the low voltage control circuit has three pins as input terminals;

a stabilized voltage integration block is connected via a first resistor to a temperature sensitive diode and first and second diodes which are connected in series with one another, and is grounded via a negative electrode of the second diode, a node of the first resistor and the temperature sensitive diode is connected to a fifth pin of the SCM, thus functioning as the temperature sampling circuit;

a negative electrode of the battery is connected via an insert connector to an end of second and third resistors, the other end of second resistor is grounded, and the other end of the third resistor is connected to a capacitor and a sixth pin of the SCM, thus functioning as the charging current sampling circuit;

a positive electrode of the battery is connected via an insert connector to a positive electrode of a third diode and an end of a contact of a relay, a negative electrode of the third diode is connected to a coil of the relay and an end of a fourth resistor, the other end of the fourth resistor is grounded via a fifth resistor which is connected in parallel with a capacitor, functioning as a voltage division filtering circuit, and the voltage division point of the fourth and fifth resistors is connected to a seventh pin of the SCM, thus functioning as the charging voltage sampling circuit;

the other end of the contact of the relay is connected to a negative electrode of a fourth diode, a positive electrode of the fourth diode is connected to a fifth connecting terminal of a secondary coil of a high frequency transformer, and a sixth connecting terminal of the secondary coil is grounded.

3. The intelligent pulse temperature control charger according to claim 2, characterized in that in the low voltage control circuit, the battery is connected with an insert connector, the battery has its positive electrode voltage-divided via the third diode, the coil of the relay, twelfth and thirteenth resistors, is filtered via capacitors, is voltage stabilized via the stabilized voltage integration block, and is fine-tuned via a resistor, to output a voltage of 5.12V, and is filtered via capacitors, to supply the SCM with operation power.

4. The intelligent pulse temperature control charger according to claim 1, characterized in that in the high voltage switch power supply circuit, a collector of a photoelectric triode of the photoelectric coupler is connected to a node of eleventh and twelfth resistors, the other end of the eleventh resistor is extended into two branches, one of which is connected via a resistor to a first connecting terminal of a primary coil of the high frequency transformer and the other of which is connected via a resistor and a diode to a third connecting terminal of the primary coil of the high frequency transformer, and the other end of the twelfth resistor is connected to a second pin of the SCM.

\* \* \* \* \*